United States Patent
Nishiyama et al.

(10) Patent No.: US 8,717,708 B2
(45) Date of Patent: May 6, 2014

(54) MAGNETIC HEAD AND MAGNETIC DISK APPARATUS

(75) Inventors: Mao Nishiyama, Kanagawa (JP); Shuji Nishida, Kanagawa (JP); Hideaki Maeda, Kanagawa (JP); Masafumi Mochizuki, Kanagawa-ken (JP)

(73) Assignee: HGST Netherlands B.V., Amsterdam (NL)

( * ) Notice: Subject to any disclaimer, the term of this patent is extended or adjusted under 35 U.S.C. 154(b) by 717 days.

(21) Appl. No.: 12/315,523

(22) Filed: Dec. 3, 2008

(65) Prior Publication Data

US 2009/0161263 A1    Jun. 25, 2009

(30) Foreign Application Priority Data

Dec. 25, 2007 (JP) .................................. 2007-332747

(51) Int. Cl.
*G11B 5/127* (2006.01)

(52) U.S. Cl.
USPC ........................ 360/125.01; 428/815; 428/816

(58) Field of Classification Search
None
See application file for complete search history.

(56) References Cited

U.S. PATENT DOCUMENTS

| | | | | |
|---|---|---|---|---|
| 5,073,836 A | * | 12/1991 | Gill et al. | 360/317 |
| 2006/0082930 A1 | * | 4/2006 | Fukui et al. | 360/317 |
| 2006/0103982 A1 | * | 5/2006 | Nakamoto et al. | 360/126 |
| 2006/0139815 A1 | | 6/2006 | Nishida et al. | |
| 2006/0209459 A1 | * | 9/2006 | Im et al. | 360/126 |
| 2008/0141522 A1 | * | 6/2008 | Baer et al. | 29/603.12 |

* cited by examiner

*Primary Examiner* — Holly Rickman
*Assistant Examiner* — Linda Chau
(74) *Attorney, Agent, or Firm* — Brokaw Patent Law PC; Christopher J. Brokaw (57) ABSTRACT

Embodiments of the present invention provide a magnetic head for perpendicular magnetic recording, and a magnetic disk apparatus capable of preventing data erasure caused by alignment marks. In an embodiment, the magnetic head includes a head element including at least a main pole having a pole face on a flying surface and an auxiliary pole; alignment marks made of a magnetic material and used to detect the amount of lapping work when lapping the pole face of the main pole; and members made of a magnetic material, continuously extending in either direction with respect to the position of the main pole from within the alignment marks outward at least beyond the alignment marks.

19 Claims, 5 Drawing Sheets

MAGNETIC HEAD AND MAGNETIC DISK APPARATUS

CROSS-REFERENCE TO RELATED APPLICATION

The instant nonprovisional patent application claims priority to Japanese Patent Application No. 2007-332747, filed Dec. 25, 2007 and which is incorporated by reference herein for all purposes.

BACKGROUND OF THE INVENTION

Magnetic disk systems based on perpendicular magnetic recording are increasingly employed. In such a magnetic disk system based on perpendicular magnetic recording, a magnetic disk having a magnetic recording layer under which a soft magnetic underlayer is formed and a single-pole type magnetic head including a main pole having a pole face facing the magnetic disk and an auxiliary pole are used.

The main pole of such magnetic head has the fore-end portion of a long thin extension toward the pole face. Because the length of this fore-end portion affects the properties of a magnetic field for recording, it is required to lap the pole face with a high accuracy. For this purpose, alignment marks may be provided and a method of lapping the pole face, while detecting the amount of lapping work may be used.

BRIEF SUMMARY OF THE INVENTION

Embodiments of the present invention provide a magnetic head for perpendicular magnetic recording, and a magnetic disk apparatus capable of preventing data erasure caused by alignment marks. In the particular embodiment shown in FIG. 3, the magnetic head includes a head element 50 including at least a main pole 51 having a pole face 51a on a flying surface and an auxiliary pole 53; alignment marks 60b, 60c made of a magnetic material and used to detect the amount of lapping work when lapping the pole face 51a of the main pole 51; and members 53b, 53c made of a magnetic material, continuously extending in either direction with respect to the position of the main pole 51 from within the alignment marks 60b, 60c outward at least beyond the alignment marks.

DETAILED DESCRIPTION OF THE INVENTION

Embodiments of the present invention relate to a magnetic head and a magnetic disk apparatus for perpendicular magnetic recording.

After a thorough study, the following has been found: in a magnetic head with alignment marks, when an external magnetic field is produced in an in-plane direction of the magnetic disk in the enclosure of a magnetic disk system, magnetic flux from the soft magnetic underlayer of the magnetic disk concentrates on the alignment marks and such concentration of magnetic flux creates a risk of erasing data recorded in the magnetic recording layer.

Embodiments of the present invention have been made through consideration of the above situation, and embodiments of the invention provide a magnetic head for perpendicular magnetic recording and a magnetic disk apparatus capable of inhibiting data erasure caused by alignment marks.

Embodiments of the present invention reside in a magnetic head for perpendicular magnetic recording, flying above a rotating magnetic disk and carrying out data writing and reading, characterized by a head element including at least a main pole having a pole face on a flying surface facing the magnetic disk and an auxiliary pole; alignment marks made of a magnetic material and used to detect the amount of lapping work when lapping the pole face of the main pole; and members made of a magnetic material, continuously extending in either direction with respect to the position of the main pole from within the alignment marks outward at least beyond the alignment marks.

In an aspect of an embodiment of the present invention, the members may include at least a subset of members included in the head element.

In an aspect of embodiments of the present invention, the members may continuously extend in either direction with respect to the main pole from the opposite side of the alignment marks outward beyond the alignment marks.

In an aspect of embodiments of the present invention, the alignment marks may be formed respectively in either side of the main pole and the members may continuously extend in either direction with respect to the main pole outward beyond one of the alignment marks and outward beyond the other one of the alignment marks.

In an aspect of embodiments of the present invention, the members may be back off the flying surface behind the alignment marks at least in outward sections from the alignment marks.

In an aspect of embodiments of the present invention, the members may be extension parts of an auxiliary pole included in the head element.

In an aspect of embodiments of the present invention, the head element may further include a read head and a pair of magnetic shields sandwiching the read head therebetween, and the members may be the parts of at least one of the pair of magnetic shields.

Secondly, embodiments of the present invention may reside in a magnetic head for perpendicular magnetic recording, flying above a rotating magnetic disk and carrying out data writing and reading, characterized by a main pole having a pole face on a flying surface facing the magnetic disk; an alignment mark formed in at least one side of track width direction with respect to the main pole, made of a magnetic material and used to detect the amount of lapping work when lapping the pole face of the main pole; and an auxiliary pole whose ends extend along the track width direction outward beyond the alignment mark.

In an aspect of embodiments of the present invention, a distance along the track width direction from the main pole to the alignment mark is not more than 65% of a distance along the track width direction from the position corresponding to the main pole on the auxiliary pole to each of the ends.

In an aspect of embodiments of the present invention, the magnetic head may further include a magnetic shield sandwiching the main pole between the magnetic field and the auxiliary pole, and a distance along the track width direction from each end of the magnetic shield to the alignment mark may fall within the range from 25% to 35% of a distance along the track width direction from each end of the magnetic shield to each end of the auxiliary pole.

In an aspect of embodiments of the present invention, the magnetic head may further include a magnetic shield sandwiching the main pole between the magnetic field and the auxiliary pole, and the alignment mark may be formed at a certain distance from the main pole within a line connecting each end of the auxiliary pole with each end of the magnetic shield.

In an aspect of embodiments of the present invention, when an external magnetic field is applied in the track width direction, the intensity of a magnetic field produced from the alignment mark may be smaller than the intensity of a magnetic field produced from the main pole.

In an aspect of embodiments of the present invention, when an external magnetic field is applied in the track width direction, the intensity of a magnetic field produced from the alignment mark may be smaller than the intensity of a magnetic field produced from the ends of the auxiliary pole.

In an aspect of embodiments of the present invention, the magnetic head may further include a magnetic shield sandwiching the main pole between the magnetic field and the auxiliary pole and, when an external magnetic field is applied in the track width direction, the intensity of a magnetic field produced from the alignment mark may be smaller than the intensity of a magnetic field produced from the ends of the magnetic shield.

Further, embodiments of the present invention may reside in a magnetic disk apparatus characterized by a magnetic disk for perpendicular magnetic recording including a soft magnetic layer and a magnetic recording layer formed over the soft magnetic layer; and a magnetic head for perpendicular magnetic recording, flying above a rotating magnetic disk and carrying out data writing and reading, the magnetic head including a head element including at least a main pole having a pole face on a flying surface facing the magnetic disk and an auxiliary pole; alignment marks made of a magnetic material and used to detect the amount of lapping work when lapping the pole face of the main pole; and members made of a magnetic material, continuously extending in either direction with respect to the position of the main pole from within the alignment marks outward at least beyond the alignment marks.

According to embodiments of the present invention, when an external magnetic field is produced in the in-plane direction of a magnetic disk, the resulting magnetic flux flow into the members continuously extending from within the alignment marks outward at least beyond the alignment marks. Hence, it is possible to prevent magnetic flux concentration on the alignment marks and, consequently, to inhibit data erasure caused by the alignment marks.

An embodiment of the present invention is described with reference to the drawings.

Figure 1:
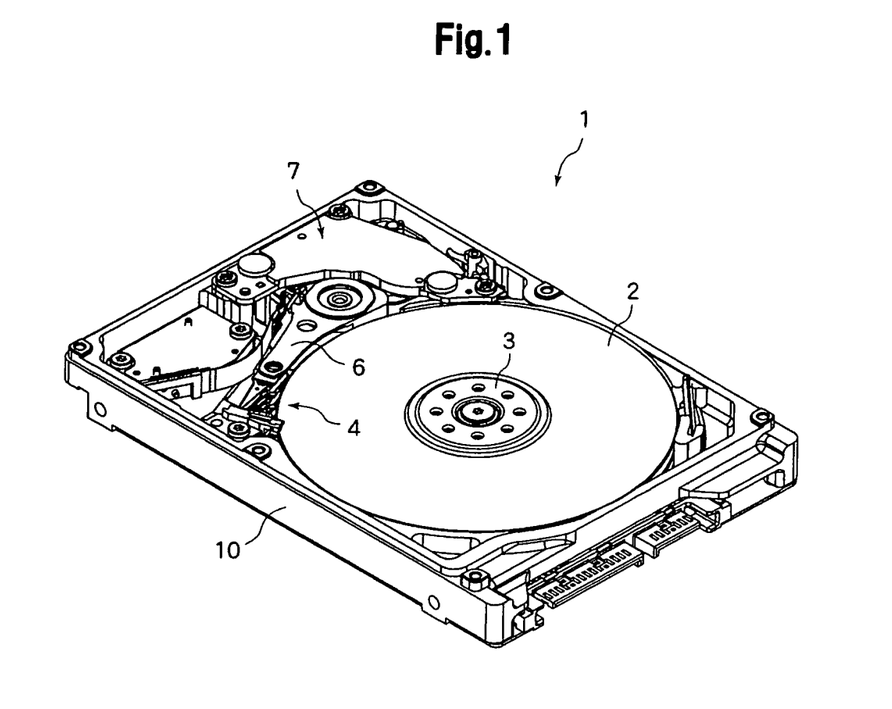
FIG. 1 is an exemplary perspective view of a magnetic disk apparatus according to one embodiment of the present invention.

FIG. 1 presents a perspective view of a magnetic disk apparatus 1 according to one embodiment of the present invention. The magnetic disk apparatus 1 includes a magnetic disk 2, a head supporting arm 6, and other elements embraced in an enclosure 10 (DE: Disk Enclosure). In this figure, a cover part of the enclosure 10 is not shown.

The magnetic disk 2 is fit on a spindle motor 3 provided at the bottom of the enclosure 10. This magnetic disk 2 is a magnetic disk for perpendicular magnetic recording having a magnetic recording layer under which a soft magnetic underlayer is formed.

The head supporting arm 6 is supported in close proximity to the magnetic disk 2. At the fore-end of the head supporting arm 6, a magnetic head 4 in accordance with an embodiment of the present invention is supported. The magnetic head 4 flies above and just proximal to magnetic disk 2 and carries out data writing and reading. This magnetic head 4 is a magnetic head for perpendicular magnetic recording and its specific configuration will be detailed later.

On the other hand, at the rear end of the head supporting arm 6, a voice coil motor 7 is provided. The voice coil motor 7 swivels the head supporting arm 6 so that the magnetic head 4 moves in a substantially radial direction of the magnetic disk 2.

Figure 2:
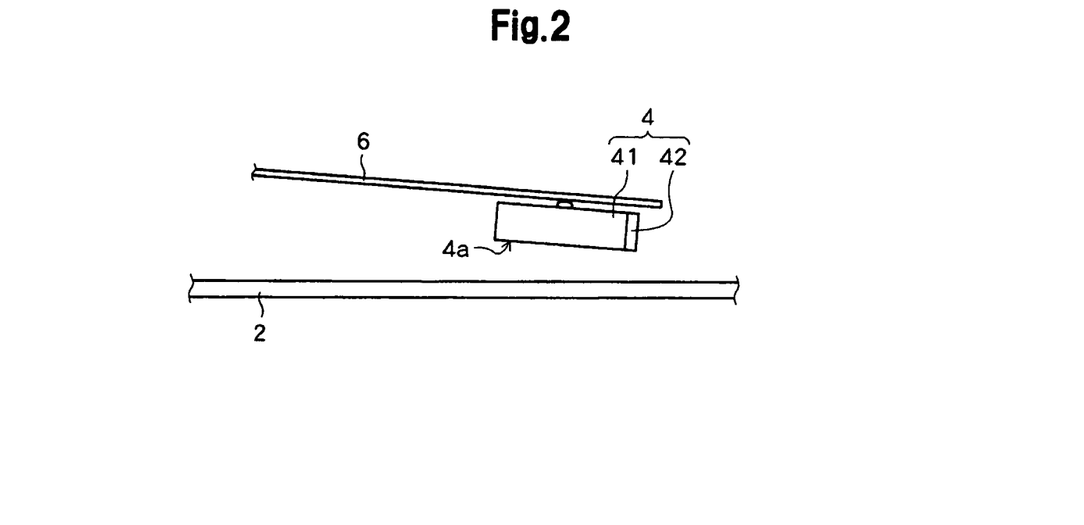
FIG. 2 depicts the flying state of a magnetic head according to one embodiment of the present invention.

FIG. 2 depicts the flying state of the magnetic head 4. The magnetic head 4 has an Air bearing Surface (ABS) that is defined on its flying surface 4a facing the magnetic disk 2 and flies above the rotating magnetic disk 2 due to a wedge film effect of air. The magnetic head 4 has a rectangular solid shaped slider 41 made of a sintered material consisting of alumina and titanium carbide (hereinafter referred to as AlTiC) and a thin film portion 42 formed at the air outflow (trailing) end of the slider 41 by a thin-film formation technology.

Inside the thin film portion 42, a head element 50 which will be described below is formed. Of the thin-film portion 42, a part other than the head element 50 is made of AlTiC, the same material as for the slider substrate 41.

Figure 3:
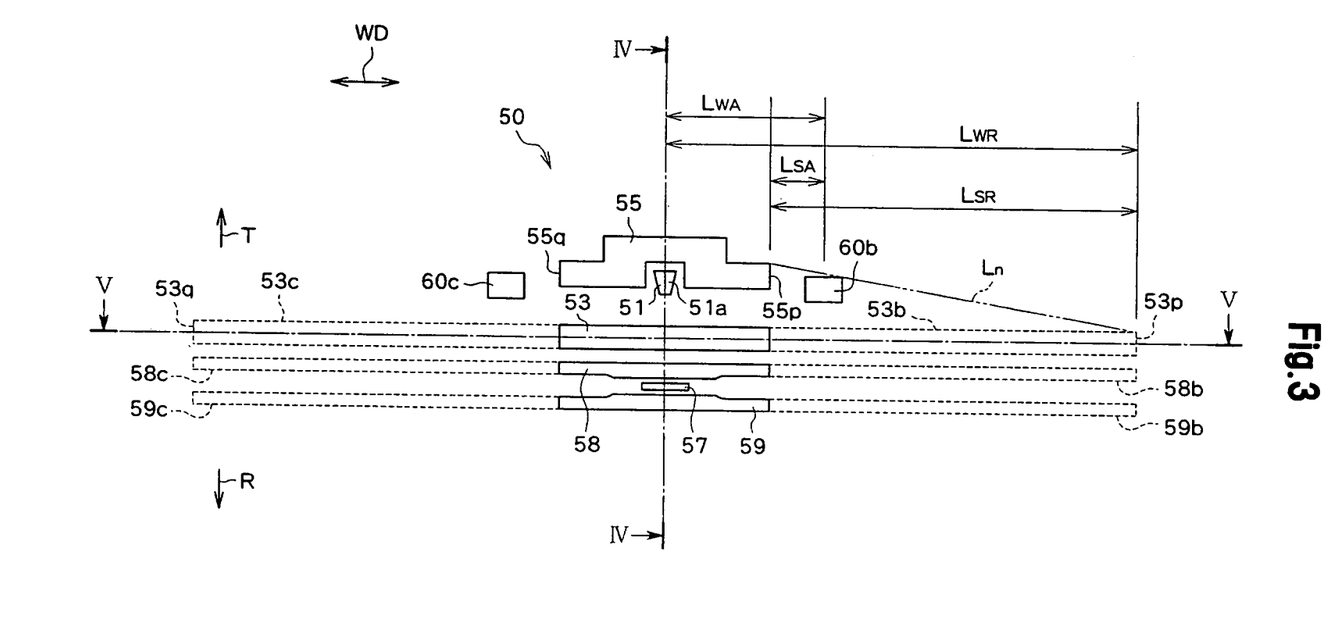
FIG. 3 depicts the head element formed in the thin film portion, viewed from the flying surface.
Figure 4:
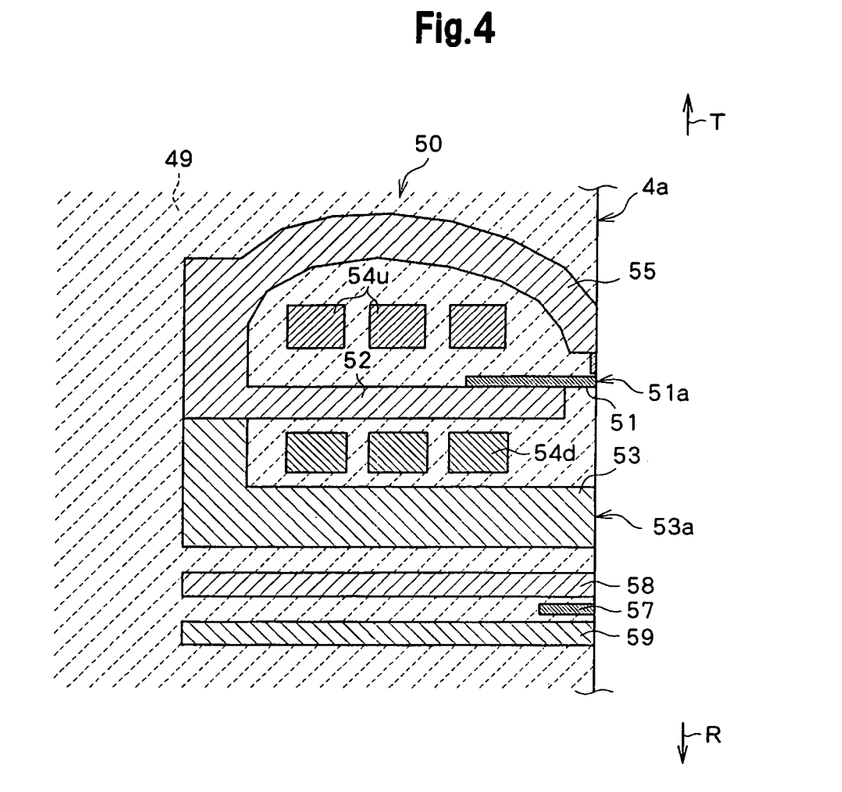
FIG. 4 is an exemplary cross sectional view along a IV-IV line in FIG. 3.
Figure 5:
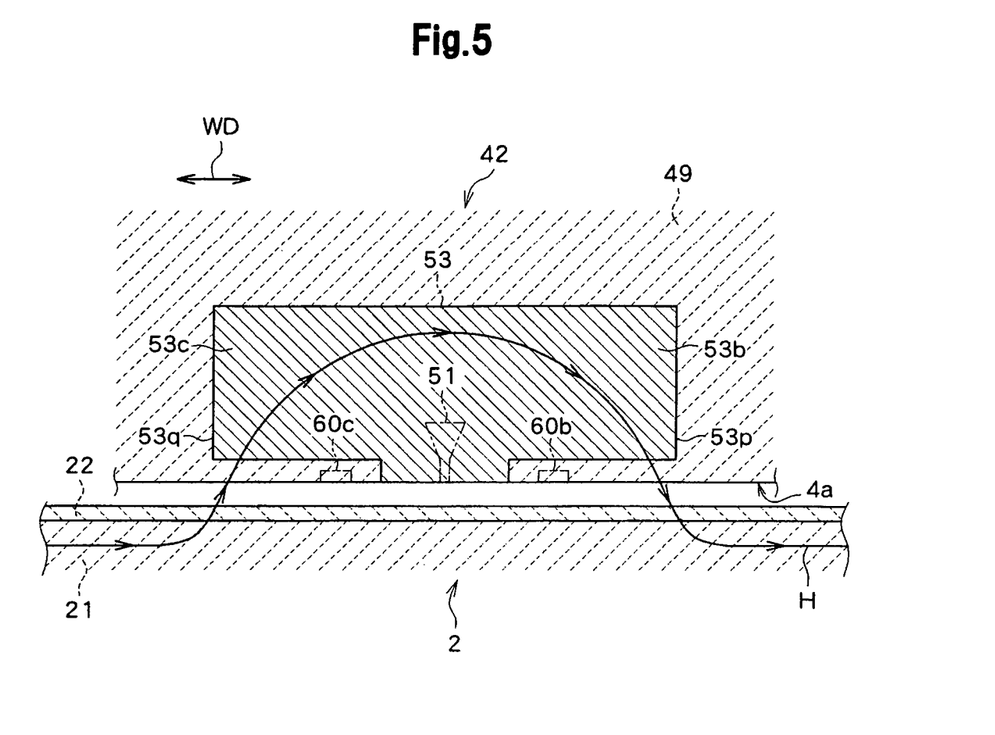
FIG. 5 is an exemplary cross sectional view along a V-V line in FIG. 3.

FIG. 3 depicts the head element 50 formed in the thin film portion 42 (thin film portion 42 is identified as 49 in FIGS. 4 and 5), viewed from the flying surface 4a. FIG. 4 is a cross sectional view along a IV-IV line in FIG. 3. FIG. 5 is a cross sectional view along a V-V line in FIG. 3. Arrow WD in the figures indicates a direction corresponding to the width direction of tracks formed on the magnetic disk 2 (track width direction). Arrow T in the figures indicates the trailing direction and arrow R indicates the leading direction.

The head element 50 includes a main pole and an auxiliary pole 53 comprising a single-pole type recording head. The main pole 51 has a pole face 51a at the fore-end of a long and thin extension toward the flying surface 4a and the pole face 51a is exposed on the flying surface 4a. The main pole 51 is mounted on a yoke 52, excited by coils 54u, 54d disposed to sandwich the yoke 52 between them, and emits a magnetic field for recording from the pole face 51a.

The auxiliary pole 53 is provided in the leading side with respect to the main pole 51 and its end far from the flying surface 4a is magnetically connected to the main pole 51. The magnetic field for recording produced from the pole face 51a of the main pole 51 perpendicularly pierces the magnetic recording layer of the magnetic disk 2, loops back from the soft magnetic underlayer, and then flows into the auxiliary pole 53. The auxiliary pole 53 may be provided in the trailing side with respect to the main pole 51.

The auxiliary pole 53 has extension parts 53b, 53c respectively in both sides of the track width direction WD. These extension parts 53b, 53c are formed to be somewhat back off the flying surface 4a, as shown in FIG. 5, and are not exposed on the flying surface 4a. Not so restricted, the auxiliary pole 53 may be formed such that extension parts 53b, 53c are formed as a rectangular solid exposed on the flying surface 4a.

The head element 50 further includes a recording shield (magnetic shield) 55 disposed so as to sandwich the main pole 51 between it and the auxiliary pole 53. The recording shield 55 is provided in the trailing side with regard to the main pole 51 and formed to surround the trailing side section around the main pole 51. The recording shield 55 may be formed to surround the both side sections in the track width direction WD with respect to the main pole 51.

The head element 50 further includes a read head 57 including a magnetoresistive element and a pair of read shields (magnetic shields) 58, 59 disposed so as to sandwich the read head 57 between them. These read shields 58, 59 have extension parts 58b, 58c, 59b, 59c, respectively, like the above auxiliary pole 53.

The members included in the head element 50 (except for the coils 54u, 54d and the read head 57) are made of a soft magnetic material such as permalloy.

Then, as shown in FIG. 3, in the thin film portion 42 of the magnetic head 4, there are alignment marks 60b, 60c (hereinafter referred to as AL marks) disposed respectively in both sides of the track width direction WD with respect to the main pole 51. These AL marks 60b, 60c are provided in close proximity to the flying surface 4a and their edge faces are exposed on the flying surface 4a. Also, the AL marks 60b, 60c are provided in the same layer as the yoke 52 (see FIG. 4) on which the main pole 51 is mounted and made of a soft magnetic material such as permalloy, the same material as for the yoke 52.

These AL marks 60b, 60c are the marks used to detect the amount of lapping work when lapping the pole face 51a of the main pole 51. In particular, an electrode not shown is connected to the AL marks 60b, 60c. When the pole face 51a of the main pole 51 as well as the AL marks 60b, 60c are lapped, the resulting decrease in the volume causes a decrease in the electric resistance. From the thus decreased electric resistance, the amount of lapped AL marks 60b, 60c are detected. Thus, the amount of lapping work done to the main pole 51 may be detected indirectly.

Such lapping of the pole face 51a is performed when defining the ABS form on the flying surface 4a by lapping.

Here, as shown in FIG. 3, the ends 53p, 53q of the above auxiliary pole 53 extend outward even beyond the AL marks 60b, 60c, respectively, along the track width direction WD. Consequently, as shown in FIG. 5, when an external magnetic field along the track width direction WD is produced, the magnetic flux looped back from the soft magnetic underlayer 21 of the magnetic disk 2 is mainly absorbed by the end 53q extending outward beyond one AL mark 60c. Then, the magnetic flux follows a path in which it passes through the auxiliary pole 53 and, from the end 53p extending outward beyond the other AL mark 60b, returns to the soft magnetic underlayer 21 again. This alleviates magnetic flux concentration on the AL marks 60b, 60c and data erasure caused by the AL marks 60b, 60c may be prevented.

Figure 6:
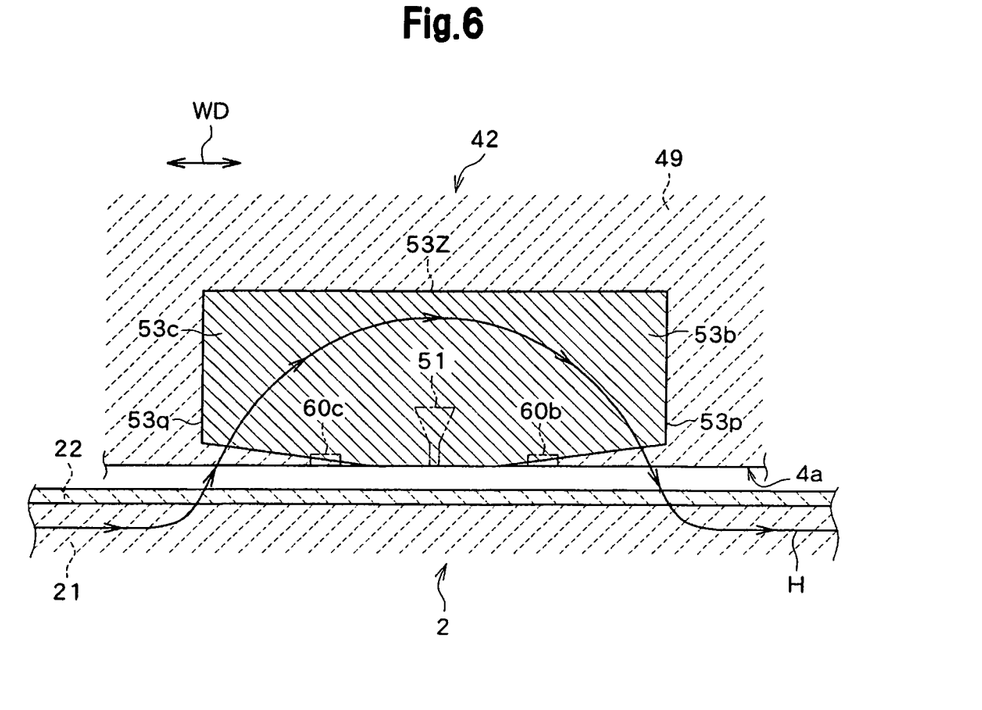
FIG. 6 depicts an exemplary modification example of the auxiliary pole.

Since the extension parts 53b, 53c of the auxiliary pole 53 are back off the flying surface 4a, the magnetic flux flows into the end 53q from the soft magnetic underlayer 21 and the magnetic flux to return from the end 53p to the soft magnetic underlayer 21 may be dispersed across the magnetic recording layer. This may reduce the risk of data erasure in the magnetic recording layer 22. Not limited to this form, the extension parts 53b, 53c may be tapered, gradually going off the flying surface 4a toward the ends 53p, 53q, like an auxiliary pole 53Z which is shown in FIG. 6.

Since the above-mentioned read shields 58, 59 have the same form as the auxiliary pole 53, the above-described effect may be obtained by the read shields 58, 59 as well. Therefore, by arranging the auxiliary pole 53 and the read shields 58, 59 in laminae, the above effect may be multiplied. It may be possible that the auxiliary pole 53 does not have the extension parts 53b, 53c and the above effect is produced by at least one of the read shields 58, 59.

As described above, the auxiliary pole 53 continuously extends in either direction with respect to the position of the main pole 51 from within the AL marks 60b, 60c outward at least beyond the AL marks. Thereby, it is possible to alleviate magnetic flux concentration on the AL marks 60b, 60c and, consequently, to prevent data erasure caused by the AL marks 60b, 60c.

Owing to the fact that the auxiliary pole 53 is formed to continuously extend outward beyond one AL mark 60b and outward beyond the other AL mark 60c, the magnetic flux may be dispersed over a wide range. It is also possible to alleviate magnetic flux concentration on each of the two AL marks 60b, 60c by one auxiliary pole 53.

The auxiliary pole 53 disposed near to the main pole 51 is formed to extend continuously at least from inside the AL marks 60b, 60c outward beyond the AL marks. Accordingly, the magnetic flux from the soft magnetic underlayer 21 flow into the auxiliary pole 53 in the vicinity of the AL marks 60b. Thus, it is possible to effectively alleviate magnetic flux concentration on each of the two AL marks 60b, 60c.

Not limited to this case, even in a case where relatively small magnetic members similar to the AL marks 60b, 60c are provided in the vicinity of the main pole 51, the same effect as described above may be obtained, provided that, inter alia, the auxiliary pole 53 continuously extends in either direction with respect to the position of the main pole 51 from within the magnetic members outward at least beyond the magnetic members.

The positions at which the AL marks 60b, 60c should be formed are described specifically with reference to FIG. 3. In the following description, the position of one AL mark 60b is described, but the same applies to the position of the other AL mark 60c.

A distance $L_{WA}$ along the track width direction WD from the main pole 51 to the AL mark 60b may be not more than 65% of a distance $L_{WR}$ along the track width direction WD from the position corresponding to the main pole 51 on the auxiliary pole 53 to its end 53p.

A distance $L_{SA}$ along the track width direction WD from the end 55p of the recording shield 55 to the AL mark 60b may fall within the range from 25% to 35% of a distance $L_{SR}$ along the track width direction WD from the end 55p of the recording shield 55 to the end 53p of the auxiliary pole 53.

Additionally, the AL mark 60b may be formed at a certain distance from the main pole 51 within a line $L_n$ connecting the end 53p of the auxiliary pole 53 with the end 53p of the recording shield 55.

In these cases, it is possible to sufficiently alleviate magnetic flux concentration on the AL mark 60b owing to the auxiliary pole 53 extending outward beyond the AL mark 60b. The AL mark 60b may be located close to the main pole 51 to an extent that it does not contact any other magnetic member.

In an embodiment of the magnetic head 4 configured as described above, when an external magnetic field is applied in the track width direction WD, the intensity of a magnetic field produced from the AL marks 60b, 60c may be made smaller than the intensity of a magnetic field produced from the main pole 51. Here, the magnetic field produced from the main pole 51 is the magnetic field resulting from that the above-mentioned coils 54u, 54d excites the main pole 51 upon the application of an external magnetic field.

Additionally, when an external magnetic field is applied in the track width direction WD, the intensity of a magnetic field produced from the AL marks 60b, 60c may be made smaller than the intensity of a magnetic field produced from the ends 53p, 53q of the auxiliary pole 53.

Moreover, when an external magnetic field is applied in the track width direction WD, the intensity of a magnetic field produced from the AL marks 60b, 60c may be made smaller than the intensity of a magnetic field produced from the ends 53p, 53q of the magnetic shield.

Figure 7:
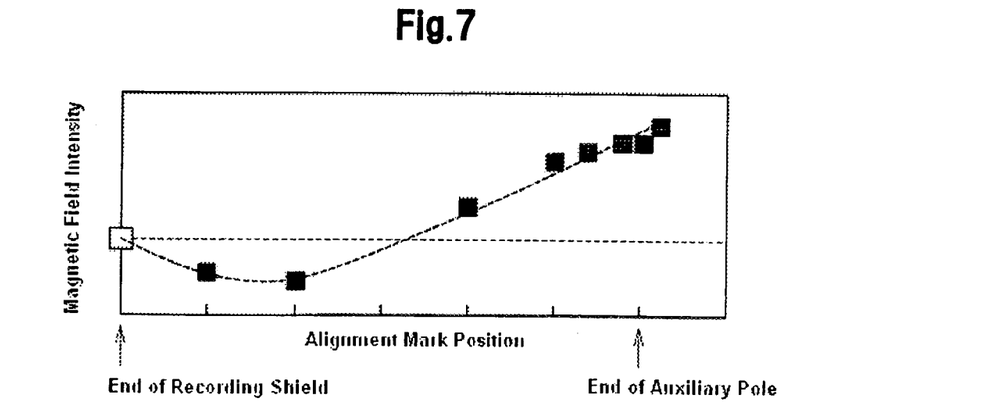
FIG. 7 is an exemplary graph representing the intensity of the magnetic field produced from the alignment marks in relation to varied positions of the alignment marks.

In the above-described embodiment, when positions of the AL marks 60b, 60c are varied in the track width direction WI, the intensity of the magnetic field produced from the AL marks 60b, 60c was calculated by three-dimensional magnetic field calculation. The result of the calculation is shown in FIG. 7. In this figure, a dotted line indicates the intensity of the magnetic field produced from the ends 55p, 55q of the recording shield 55. According to this, as the AL marks 60b, 60c are repositioned gradually closer to the main pole 51, the magnetic field intensity gradually decreases and becomes the smallest at a position short of the ends 55p, 55q of the recording shield.

Here, the thickness of the soft magnetic underlayer 21 was set to be 60 nm. The thickness of the magnetic shield 55 was set to be 60 nm. As for gaps between the main pole 51 and the magnetic shield 55 in each side, a gap of 30 nm was provided in the trailing side and a gap of 50 nm was provided in the other side.

Other parameters for the calculation are as follows. The width of the main pole 51 was set to be 50 nm. The pole face 51a of the main pole 51 was formed to have a trapezoidal geometry with a bevel angle of 8 degrees. Its film thickness was set to be 106 nm. As for the material of the main pole 51, CoNiFe having a saturation flux density of 2.4 T and a relative magnetic permeability of 500 was assumed to be used. The yoke 52 for the main pole 51 was assumed to be made of 80 at. % Ni-20 at. % Fe with a saturation flux density of 1.0 T. The auxiliary pole 53 and the read shields 58, 59 were assumed to be made of 80 at. % Ni-20 at. % Fe having a saturation flux density of 1.0 T. Their dimensions were set as follows: a width of 30 μm in the track width WD direction exposed on the flying surface 4a; a width of 90 μm including the sections being back off the flying surface 4a; a length of 16 μm in the element height direction; and a film thickness of 2 μm. As for the magnetic material of the magnetic shield 55, 45 at. % Ni-55 at. % Fe having a saturation flux density of 1.7 T and a relative magnetic permeability of 1000 was assumed to be used.

As for the material of the AL marks 60, 80 at. % Ni-20 at. % Fe having a saturation flux density of 1.0 T was assumed to be used. Their dimensions were set as follows: a width of 3 μm in the track width direction WD; a length of 3 μm in the element height direction; and a film thickness of 1.5 μm.

The soft magnetic underlayer 21 of the magnetic disk 2 was assumed to be made of a material having a saturation flux density of 1.35 T. As for the magnetic recording layer 22, its thickness of 16 nm was only considered. A distance of 8.5 nm from the magnetic head 4 to the surface of the magnetic recording layer 22 was assumed. Hence, a distance of 40 nm from the magnetic head 4 to the surface of the underlayer 21 was set. The recording magnetic field at an assumed position of 20 nm from the flying surface 4a in the center of the magnetic recording layer 22 was calculated.

What is claimed is:

1. A magnetic head for perpendicular magnetic recording, flying above a rotating magnetic disk and carrying out data writing and reading, the magnetic head comprising:
a head element including a main pole mounted on a yoke and having a pole face on a flying surface facing said magnetic disk and an auxiliary pole configured for return of a magnetic field emitted from said main pole;
alignment marks made of a magnetic material in a same layer as said yoke and used to detect an amount of lapping work when lapping the pole face of said main pole; and
members made of a magnetic material, continuously extending in either direction with respect to a position of said main pole from within said alignment marks outward at least beyond the alignment marks to alleviate magnetic flux concentration on said alignment marks;
wherein a first portion of said members is flush with the flying surface of the magnetic head, wherein a second portion of said members is gradually tapered away from the flying surface;
wherein the alignment marks are in proximity to only the second portion of said members.

2. The magnetic head according to claim 1, wherein said members include at least a subset of members included in said head element.

3. The magnetic head according to claim 1, wherein said members continuously extend in either direction with respect to said main pole from an opposite side of said alignment marks outward beyond the alignment marks.

4. The magnetic head according to claim 1, wherein:
said alignment marks are formed respectively in either side of said main pole, and
said members continuously extend in either direction with respect to said main pole outward beyond one of said alignment marks and outward beyond the other one of said alignment marks.

5. The magnetic head according to claim 1, wherein said members are off of said flying surface behind the alignment marks at least in outward sections from said alignment marks.

6. The magnetic head according to claim 1, wherein said members are extension parts of said auxiliary pole.

7. The magnetic head according to claim 1, wherein:
said head element further includes a read head and a pair of magnetic shields sandwiching the read head therebetween, and
said members are the parts of at least one of said pair of magnetic shields.

8. A magnetic head for perpendicular magnetic recording, flying above a rotating magnetic disk and carrying out data writing and reading, the magnetic head comprising:
a main pole mounted on a yoke and having a pole face on a flying surface facing said magnetic disk;
an alignment mark formed in a same layer as said yoke in at least one side of track width direction with respect to said main pole, made of a magnetic material and used to detect the amount of lapping work when lapping the pole face of said main pole; and
an auxiliary pole, configured for return of a magnetic field emitted from said main pole, whose ends extend along said track width direction outward beyond said alignment mark to alleviate magnetic flux concentration on said alignment marks,
wherein a first portion of said auxiliary pole is flush with the flying surface of the magnetic head, wherein a second portion of said auxiliary pole is gradually tapered away from the flying surface, and
wherein the alignment mark is in proximity to only the second portion.

9. The magnetic head according to claim 8, wherein a distance along said track width direction from said main pole to said alignment mark is not more than 65% of a distance along said track width direction from the position corresponding to said main pole on said auxiliary pole to each of said ends.

10. The magnetic head according to claim 8, further comprising: a magnetic shield enclosing three sides of said main pole, and wherein a distance along said track width direction from each end of said magnetic shield to said alignment mark falls within the range from 25% to 35% of a distance along said track width direction from each end of said magnetic shield to each end of said auxiliary pole.

11. The magnetic head according to claim 8, further comprising: a magnetic shield enclosing three sides of said main pole, and wherein said alignment mark is formed at a certain distance from said main pole within a line connecting each end of said auxiliary pole with each end of said magnetic shield.

12. The magnetic head according to claim 8, wherein when an external magnetic field is applied in said track width direction, an intensity of a magnetic field produced from said alignment mark is smaller than an intensity of a magnetic field produced from said main pole.

13. The magnetic head according to claim 8, wherein, when an external magnetic field is applied in said track width direction, an intensity of a magnetic field produced from said alignment mark is smaller than an intensity of a magnetic field produced from the ends of said auxiliary pole.

14. The magnetic head according to claim 8, further comprising: a magnetic shield sandwiching said main pole between the magnetic field and said auxiliary pole, wherein, when an external magnetic field is applied in said track width direction, an intensity of a magnetic field produced from said alignment mark is smaller than an intensity of a magnetic field produced from the ends of said magnetic shield.

15. A magnetic disk apparatus comprising:
a magnetic disk for perpendicular magnetic recording including a soft magnetic layer and a magnetic recording layer formed over the soft magnetic layer; and
a magnetic head for perpendicular magnetic recording, flying above a rotating magnetic disk and carrying out data writing and reading, the magnetic head including a head element including at least a main pole mounted on a yoke and having a pole face on a flying surface facing said magnetic disk and an auxiliary pole configured for return of a magnetic field emitted from said main pole; alignment marks made of a magnetic material in a same layer as and of the same material as said yoke and used to detect the amount of lapping work when lapping the pole face of said main pole; and members made of a magnetic material, continuously extending in either direction with respect to the position of said main pole from within said alignment marks outward at least beyond the alignment marks to alleviate magnetic flux concentration on said alignment marks, wherein a first portion of said members is flush with the flying surface of the magnetic head, wherein a second portion of said members is tapered gradually away from the flying surface, wherein the alignment marks are in proximity to only the second portion.

16. The magnetic head according to claim 1, wherein said alignment marks are flush with the flying surface of the magnetic head.

17. The magnetic head according to claim 8, wherein said alignment mark is flush with the flying surface of the magnetic head.

18. The magnetic disk apparatus of claim 15, wherein said alignment marks are flush with the flying surface of the magnetic head.

19. The magnetic head according to claim 1, wherein said alignment marks are formed of the same magnetic material and composition as said yoke, and wherein said magnetic material and composition of said yoke differs from a material and composition of said main pole and from a composition of a magnetic shield adjacent at least one side of said main pole.

* * * * *